(12) United States Patent
Gervais, III et al.

(10) Patent No.: US 6,702,703 B2
(45) Date of Patent: Mar. 9, 2004

(54) LUBRICATION PUMP FOR INTER-AXLE DIFFERENTIAL

(75) Inventors: Edward H. Gervais, III, Cumberland, ME (US); Dale Lee Kwasniewski, Galesburg, MI (US); James Foltan Ziech, Kalamazoo, MI (US); Lawrence Paul Wagle, Fulton, MI (US)

(73) Assignee: Dana Corporation, Toledo, OH (US)

( * ) Notice: Subject to any disclaimer, the term of this patent is extended or adjusted under 35 U.S.C. 154(b) by 17 days.

(21) Appl. No.: 10/186,926

(22) Filed: Jul. 1, 2002

(65) Prior Publication Data

US 2003/0032516 A1 Feb. 13, 2003

Related U.S. Application Data

(63) Continuation-in-part of application No. 09/761,724, filed on Jan. 18, 2001.

(51) Int. Cl.[7] .............................................. F16H 57/04
(52) U.S. Cl. ........................................ 475/160; 418/32
(58) Field of Search ................................ 475/159, 160; 74/467; 184/6.12; 418/32

(56) References Cited

U.S. PATENT DOCUMENTS

| 2,861,477 | A | 11/1958 | Mueller | |
|---|---|---|---|---|
| 3,040,600 | A | 6/1962 | Mueller | |
| 3,118,387 | A | 1/1964 | Aldrich | 103/117 |
| 3,165,066 | A | 1/1965 | Phelps et al. | 173/126 |
| 3,273,501 | A | 9/1966 | Tothero | 103/3 |
| 3,393,583 | A | 7/1968 | Mueller | |
| 3,550,724 | A | 12/1970 | Vollmer | |
| 3,590,954 | A | 7/1971 | Plantan | |
| 3,762,503 | A | 10/1973 | Wilder et al. | |
| 4,171,192 | A | 10/1979 | Taylor et al. | 418/32 |
| 4,193,746 | A | 3/1980 | Aman, Jr. | 418/32 |
| 4,200,427 | A | 4/1980 | Binger et al. | 418/32 |
| 4,733,578 | A | 3/1988 | Glaze et al. | |
| 4,743,180 | A | 5/1988 | Sickenger | 418/32 |
| 4,944,662 | A | * | 7/1990 | Child | 418/32 |
| 5,302,158 | A | 4/1994 | Kwasniewski | |
| 5,334,002 | A | * | 8/1994 | Hodge | 418/32 |
| 5,494,421 | A | 2/1996 | Wada et al. | 418/32 |
| 5,702,319 | A | 12/1997 | Baxter, Jr. | |
| 5,709,627 | A | 1/1998 | Teraoka | |
| 5,711,408 | A | 1/1998 | Dick | |
| 5,916,052 | A | 6/1999 | Dick | |

FOREIGN PATENT DOCUMENTS

| EP | 0599050 A1 | 6/1994 |
|---|---|---|
| JP | 06193712 | 7/1994 |
| JP | 06193713 | 7/1994 |

* cited by examiner

Primary Examiner—Ankur Parekh
(74) Attorney, Agent, or Firm—Dykema Gossett PLLC

(57) ABSTRACT

An inter-axle differential assembly having a lubrication pump is provided. The pump is disposed between the input and output shafts of the differential within a bore defined by a side gear coupled to or integral with the output shaft. The pump includes a housing that defines first and second ports and includes an arcuate groove in a radially outer surface. A pin extends radially inwardly from the side gear and is received within the groove. The groove and pin cooperate to enable rotation of the entire pump relative to the side gear and to thereby exchange the positions of the two ports. In this manner, the assembly provides a reversible pump that provides lubricant only during relative rotation between the input and output shafts of the differential.

20 Claims, 5 Drawing Sheets

LUBRICATION PUMP FOR INTER-AXLE DIFFERENTIAL

This application is a continuation-in-part of, and claims priority to, pending U.S. application Ser. No. 09/761,724 filed on Jan. 18, 2001.

BACKGROUND OF THE INVENTION

1. Field of the Invention

The present invention relates broadly to inter-axle differential assemblies and, more particularly, to a dedicated lubrication pump for an inter-axle differential assembly.

2. Discussion of Related Art

Motor vehicles with solidly connected multiple drive axles are commonly equipped with an inter-axle differential assembly, commonly arranged in a vehicular transmission transfer case or tandem axle power divider to allow torque balance between the drive axles during the vehicle cornering, to compensate for tire size differences, etc., i.e. when there is any physical requirement for speed difference between the drive axles. The inter-axle differential assemblies are widely employed for tandem drive axles of heavy-duty trucks for on- and off-road service as a power divider.

These motor vehicles are, on occasion, driven in situations where there may be unequal traction conditions between the tires of the different drive axles. If the traction condition at any tire falls below that required for sufficient traction effort, high-speed inter-axle differential conditions may occur. These high-speed differential conditions may be potentially severely damaging to critical differential assembly components, such as shaft bearing surfaces as well as rolling contact surfaces of the differential assembly, due to lack of lubrication. In such drive axles it is common to have a supply of lubricant in a transfer case or axle housing and to provide positive lubricant pressure to the input and output shaft journals and the inter-axle differential that are disposed above the level of lubricant in the housing to prevent damaging the differential gear components during these high speed differential conditions. However, current lubrication pumps for differential assemblies are driven continuously while the vehicle is in motion, although lubrication supply is only needed during occasional conditions of relatively high-speed levels of differential action as it is well known to those skilled in the art. The continuously driven lubrication pump operates and consumes engine power irrespective of the amount of lubrication needed by the shaft journals and other components of the inter-axle differential, thus causing unnecessary parasitic losses in a vehicle power transmission and increasing fuel consumption.

Because differential rotation may occur in either rotational direction, lubrication pumps must be reversible. In other words, the pump must output lubricant in the same direction regardless of the direction of relative rotation. Some conventional pumps include an eccentric ring disposed about inner and outer rotational members (e.g., the rotor and impeller) of the pump that includes an arcuate groove. Rotation of the ring relative to the outer rotational member switches the eccentricity of the rotational members. Other conventional pumps include a porting plate disposed at one end of the inner and outer rotational elements. The porting plate likewise has an arcuate groove and can rotate relative to the inner and outer rotational members. Rotation of the plate maintains the eccentricity of the rotational members, but swaps the input and output ports of the pump. These conventional pumps are disadvantageous, however. First, the use of a reversing ring or porting plate results in a larger pump and compromises pump displacement. Second, the use of a reversing ring or porting plate requires that the inlet and outlet ports for the pump be symmetrical which reduces the efficiency of the pump.

The inventors herein have recognized a need for a lubrication pump for an inter-axle differential assembly that will minimize and/or eliminate one or more of the above-identified deficiencies.

SUMMARY OF THE INVENTION

The present invention alleviates the drawbacks of the prior art. The present invention provides an inter-axle differential assembly having a dedicated lubrication pump. The lubrication pump is drivingly coupled to two differentially rotating members of the differential assembly, and, thus, supplies lubricant only when differential action occurs. The hydraulic pump provides volumetric flow of lubricant that varies in direct proportion to the relative (or differential) rotational speed of the rotating members.

In accordance with the preferred embodiment of the present invention, the inter-axle differential assembly comprises an input shaft, an output shaft arranged coaxially with respect to each other, a differential gearing and the dedicated lubrication pump disposed between the input and output shafts. The lubrication pump is provided solely for the purpose of lubricating the shaft journals and the inter-axle differential gearing, and only when needed, i.e. the pump generates lubricant flow only during the differential action between the input shaft and the output shaft, and at a flow rate in proportion to the speed differential.

In accordance with the preferred embodiment of the present invention, the pump is of the gerotor type, and the differential is of the bevel gear type. However, other types of pumps, such as gear or vane type pumps, are within the scope of the present invention, as well as other types of differentials, such as the spur gear type. The lubrication pump includes a rotor driven by the input shaft, and a housing coupled to a side gear drivingly connected to the output shaft. Alternatively, the pump housing is coupled directly to the output shaft. The housing defines first and second ports and further defines an arcuate groove in a radially outer surface. A pin extends radially inwardly from the side gear and is received in the groove. The groove cooperates with the pin to allow rotation of the entire pump and thus enables the pump to be reversible. In response to rotation of the output shaft in a first direction relative to the input shaft, the first port assumes an inlet position and the second port assumes an outlet position. In response to rotation of the output shaft in a second direction relative to the input shaft, the first port assumes the outlet position and the second portion assumes the inlet position. An oil flow generated by the lubrication pump is supplied to the shaft journals and the inter-axle differential gearing through a gallery communicating with passages in the input and output shafts which supply lubricant to the journals for these shafts and to the inter-axle differential assembly.

Therefore, the inter-axle differential assembly in accordance with the present invention includes the dedicated lubrication pump, compactly disposed between the input and output shafts, that lubricates the differential assembly components only when needed, thus providing better efficiency and lower fuel consumption.

BRIEF DESCRIPTION OF THE DRAWINGS

Other objects and advantages of the invention will become apparent from a study of the following specification when viewed in light of the accompanying drawings, wherein.

DETAILED DESCRIPTION OF EMBODIMENTS OF THE INVENTION

The preferred embodiments of the present invention will now be described with the reference to the accompanying drawings.

Figure 1:
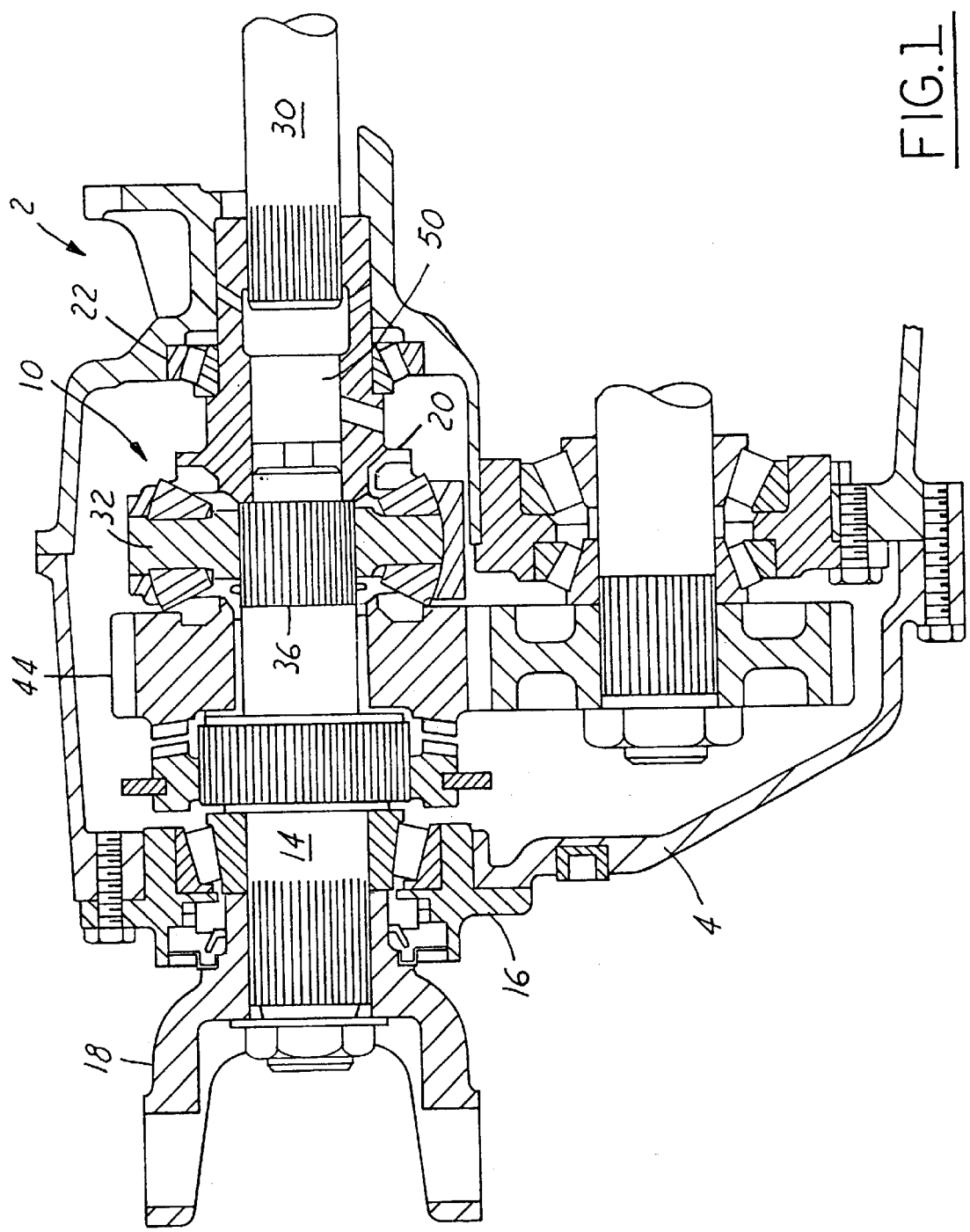
FIG. 1 is a longitudinal cross-sectional view of a tandem axle power divider that houses an inter-axle differential of the present invention.

Referring to FIG. 1, an inter-axle differential assembly 10 of the present invention disposed in a housing 4 of a tandem axle power divider indicated generally at 2, is illustrated. The housing 4 is ordinarily provided with a supply of lubricant, such as lubrication oil, therein.

Figure 2:
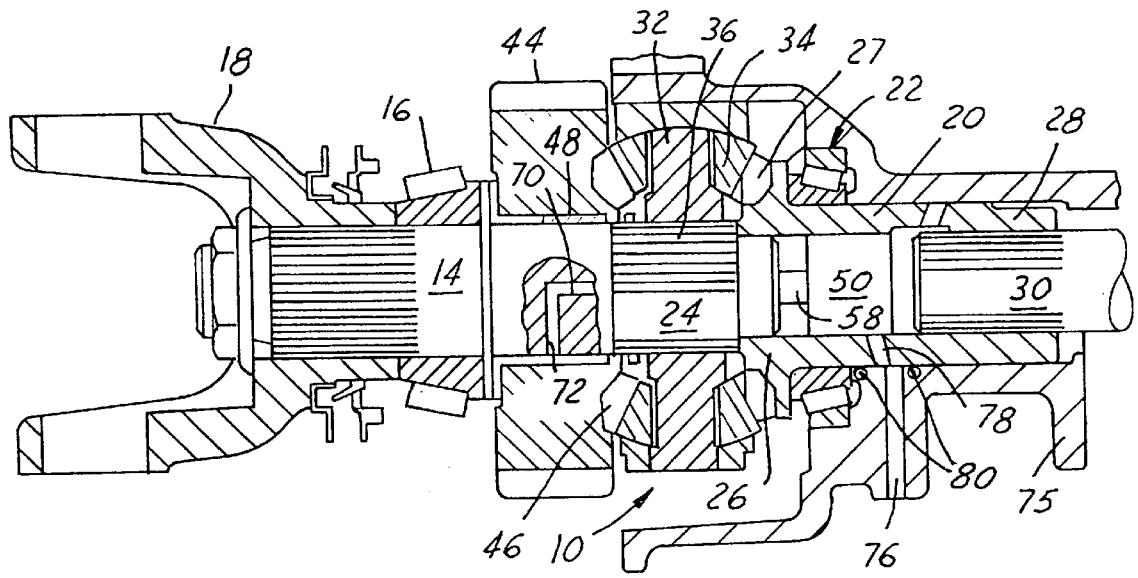
FIG. 2 is a longitudinal cross-sectional view of the inter-axle differential in accordance with the first embodiment of the present invention.

The inter-axle differential assembly 10 in accordance with the first embodiment of the present invention, illustrated in detail in FIG. 2, comprises an input shaft 14 rotatably supported in a bearing assembly indicated generally at 16, a differential spider 32 drivingly coupled to the input shaft 14 and provided with a plurality of pinion gears 34 rotatably mounted thereon, a first side gear 20 and a second side gear 44 meshing with the pinion gears 34, an output shaft 30 drivingly connected to the first side gear 20, and a dedicated lubrication pump 50 disposed between the input shaft 14 and the output shaft 30 and solely for the purpose of lubricating components of the inter-axle differential assembly 10 during the differential action between the input shaft 14 and the output shaft 30.

The input shaft 14 is rotatably supported in a bearing assembly indicated generally at 16, and has a yoke 18 attached thereto, which is adapted for receiving torque from a vehicle driveline (not shown). The differential spider 32 drivingly engages the input shaft 14 by any appropriate means, preferably through a spline connection 36. Thus, input torque is transmitted directly to the differential spider 32. In most applications, the number of the pinion gears 34 will be four, but the number can be as low as two and can be higher than four, although most practical applications would probably not contain more than six pinion gears.

The first side gear 20 is journalled in a second bearing assembly indicated generally at 22, and has a reduced diameter pilot portion 24 of the input shaft 14 journalled therein. The first side gear 20 includes a flange portion 26 integrally formed with a sleeve portion 28. The flange portion 26 is provided with a plurality of side gear teeth 27 formed thereon for meshing with the pinion gears 34. The sleeve portion 28 of the first side gear 20 is drivingly coupled with the output shaft 30. An outboard end of the output shaft 30 is adapted for connection to the rear drive axle (not shown) of the motor vehicle.

The second side gear 44 is rotatably mounted to the input shaft 14 by a sleeve bearing or bushing 48 for free rotation thereon. It will be appreciated that any other appropriate type of bearings, such as needle bearings, are also applicable. The second side gear 44 has a plurality of gear teeth 46 thereon engaging the pinion gears 34.

A lubrication pump 50, in accordance with the first embodiment of the present invention, is disposed between the input shaft 14 and the output shaft 30 of the inter-axle differential 10 within the sleeve portion 28 of the first side gear 20. In the preferred embodiment, the lubrication pump 50 is a gerotor pump.

Figure 3:
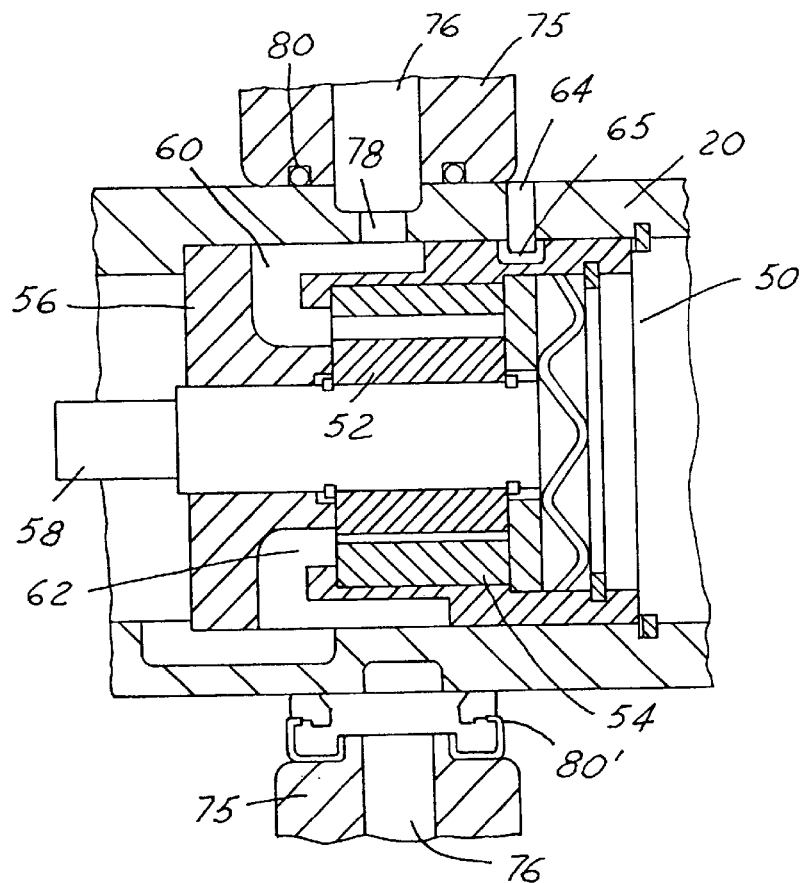
FIG. 3 is a longitudinal cross-sectional view of a portion of the inter-axle differential in accordance with the first embodiment of the present invention showing a preferred embodiment of a gerotor lubrication pump.

The reversible unidirectional flow gerotor pump 50, well known in the prior art and illustrated in detail in FIG. 3, comprises a rotor 52 having a plurality of external teeth, an impeller 54 having a plurality of internal teeth which are in meshing engagement with external teeth of the rotor 52, and a pump body 56 housing the rotor 52 and the impeller 54. The rotor 52 is eccentrically arranged relative to the impeller 54 and is drivingly connected to the input shaft 14 through a rotor shaft 58, as seen in FIG. 2. In general, the rotor 52 has one less tooth than the impeller 54, such that driving of the rotor 52 will in turn cause driving of the impeller 54. In accordance with one aspect of the present invention, the pump body 56 is secured to the side gear 20 within its sleeve portion 28 by means of a pin 64 received in an arcuate groove 65 formed in the pump body 56. An inlet port 60 and an outlet port 62 are formed in the pump body 56. Relative rotation of the rotor 52 to the impeller 54 thus provides a series of variable volume chambers within pump 50, resulting in the build up of fluid pressure and pumping of lubricant in response to relative rotation of the rotor 52 and impeller 54, and thus in response to differential rotation between the input shaft 14 and the first side gear 20. Obviously, volumetric flow of lubricant produced by the lubrication pump varies in direct proportion to the differential rotational speed of the input and output shafts.

The pump body 56 is housed within the sleeve portion 28 of the first side gear 20 and located angularly by the pin 64 in the arcuate groove 65 formed in an outer peripheral surface of the pump body 56. The groove 65 extends angularly around 180° of the outer peripheral surface of the pump body 56. Consequently, the pump body 56 is allowed to rotate 180° relative to the first side gear 20 depending on a relative direction of rotation of the rotor 52 with respect to the first side gear 20. In this way, the pump body 56 exchanges positions of the inlet port 60 and the outlet port 62 relative to the first side gear 20 in order to provide a reversible pumping function. Thus, the switching of ports 60 and 62 allows the pump 50 to provide a unidirectional flow of lubricant regardless of the direction of the rotation of the rotor 52.

Referring again to FIGS. 2 and 3, the lubricant under pressure flows from the outlet port of the lubrication pump 50 (the second port 62 in FIG. 3 through a gallery of fluid passages including a passage 70 provided in the input shaft 14 to lubricate the components of the inter-axle differential 10 via a number of cross passages, such as a cross passage 72 for lubricating the sleeve bearing 48. Additionally, the inter-axle differential assembly 10 may have supplemental lubricant delivery means, such as a splash diversion and delivery channels (not shown).

The inlet port 60 of the pump 50 is in fluid communication with an inlet passage 76 provided in a differential support carrier 75, trough an inlet cross passage 78 in the sleeve portion 28 of the first side gear 20 between seal rings 80. Alternatively, as shown in a lower portion of FIG. 3, pair of annular lip seals 80' may be used to seal the inlet passage 76. The inlet passage 76 is in turn fluidly connected to the supply of lubricant disposed in the housing 4 of the tandem axle power divider 2, and may be fitted with a check valve (not shown) or an elevated oil reservoir (not shown) to aid in pump priming.

It will be appreciated that any other appropriate types of reversible unidirectional flow hydraulic pumps such as gear, vane or wobble pin type, well known in the prior art, are within the scope of the present invention.

Figure 4:
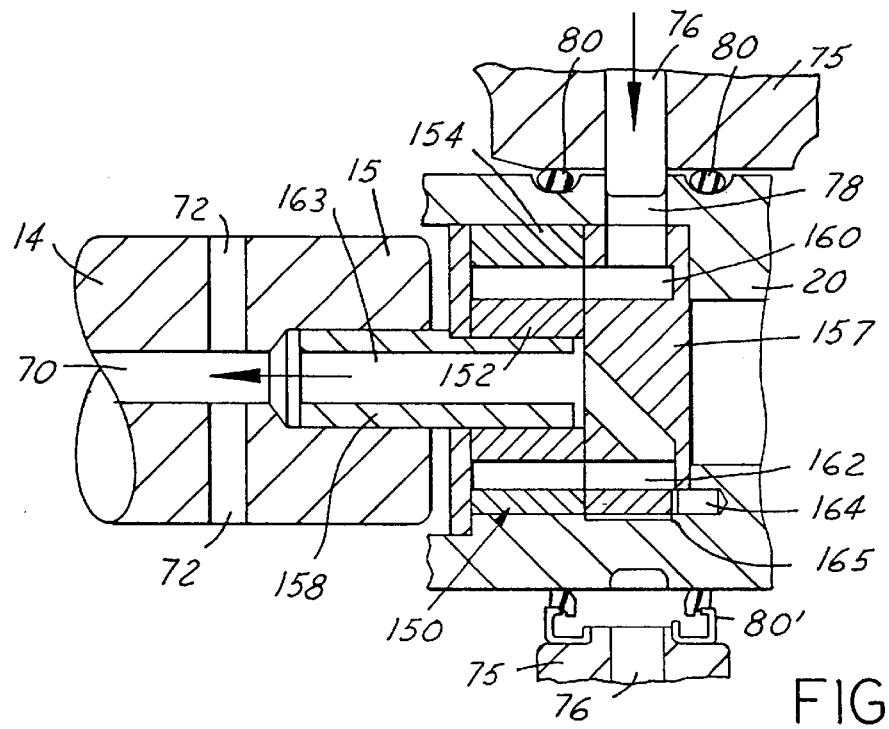
FIG. 4 is a longitudinal cross-sectional view of a portion of the inter-axle differential in accordance with the first embodiment of the present invention showing alternative embodiment of the gerotor lubrication pump.

FIG. 4 illustrates an alternative embodiment of the reversible gerotor lubrication pump used in the inter-axle differential assembly 10 in accordance with the first embodiment of the present invention. An inboard end 15 of the input shaft 14 is rotatably supported in the sleeve portion 28 of the first side gear 20. A dedicated lubrication pump 150, preferably a conventional gerotor pump of reversible unidirectional flow type, is disposed within the sleeve portion 28 of the first side gear 20 adjacent to the inboard end 15 of the input shaft 14. The lubrication gerotor pump 150 comprises a rotor 152, an impeller 154, and a port plate 157 having a first port 160 and a second port 162. The rotor 152 is drivingly connected to the input shaft 14 through a rotor shaft 158. An outlet passage 163 is formed within the tubular rotor shaft 158.

The lubricant under pressure flows from the outlet port 162 of the lubrication pump 150 through the passage 170 drilled in the input shaft 14 to lubricate the components of the inter-axle differential 10 via a number of cross passages, such as cross passages 72.

The port plate 157 is located angularly by a pin 164 in an arcuate groove 165 formed on an outer peripheral surface of the port plate 157. The groove 165 is angularly extended around an outer peripheral surface of the port plate 157 to approximately 180°. Consequently, the port plate 157 is allowed to rotate 180° relative to the first side gear 20 depending on a relative direction of rotation of the pump rotor 152 with respect to the first side gear 20. In this way, the port plate 157 exchanges positions of the inlet port 160 and the outlet port 162 relative to the first side gear 20 in order to provide a reversible pumping function. Thus, the switching of the ports 160 and 162 allows the pump 150 to provide a unidirectional flow of lubricant regardless of the direction of the rotation of the rotor 152.

The inlet port 160 of the pump 150 is in fluid communication with the inlet passage 76 provided in the differential support carrier 75, trough an inlet cross passage 78 in the sleeve portion 28 of the first side gear 20 between seal rings 80. Alternatively, as shown in a lower portion of the FIG. 4, pair of annular lip seals 80' may be used to seal the inlet passage 76. It will be appreciated that any other appropriate sealing device for sealing the inlet passage 76 is within the scope of the present invention. The inlet passage 76 is fluidly connected to the supply of lubricant disposed in the housing 4 of the tandem axle power divider 2, and may be fitted with a check valve (not shown) or an elevated oil reservoir (not shown) to aid in pump priming.

Figure 5:
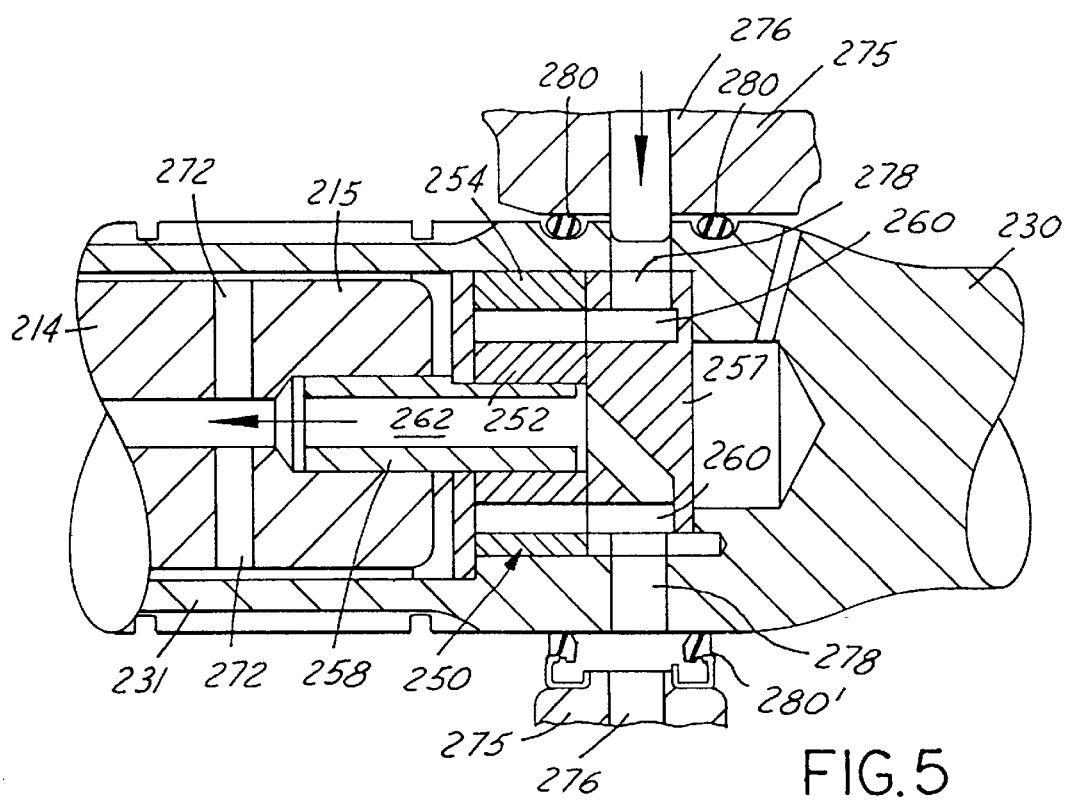
FIG. 5 is a longitudinal cross-sectional view of a portion of the inter-axle differential in accordance with the second embodiment of the present invention.

In accordance with the second embodiment of the present invention, illustrated in FIG. 5, an inboard end 215 of an input shaft 214 is rotatably supported in a tubular inboard end 231 of an output shaft 230. A dedicated lubrication pump 250, preferably of conventional reversible unidirectional gerotor type, is disposed within the tubular inboard end 231 of the output shaft 230 adjacent to the inboard end 215 of the input shaft 214. The lubrication gerotor pump 250 comprises a rotor 252, an impeller 254, and a port plate 257 having an inlet port 260. The rotor 252 is drivingly connected to the input shaft 214 through a rotor shaft 258. An outlet port 262 is provided as a passage within the tubular rotor shaft 258.

The lubricant under pressure flows from the outlet port 262 of the lubrication pump 250 through a passage 270 drilled in the input shaft 214 to lubricate the components of the inter-axle differential 10 via a number of cross passages, such as cross passages 272.

The inlet port 260 of the pump 250 is in fluid communication with an inlet passage 276 provided in a differential support carrier 275, trough an inlet cross passage 178 in the tubular inboard end 231 of the output shaft 230 between seal rings 280. Alternatively, as shown in a lower portion of the FIG. 5, pair of annular lip seals 280' may be used to seal the inlet passage 276. It will be appreciated that any other appropriate sealing device for sealing the inlet passage 276 is within the scope of the present invention. The inlet passage 276 is fluidly connected to the supply of lubricant disposed in the housing 4 of the tandem axle power divider 2, and may be fitted with a check valve (not shown) or an elevated oil reservoir (not shown) to aid in pump priming.

Figures 6, 7:
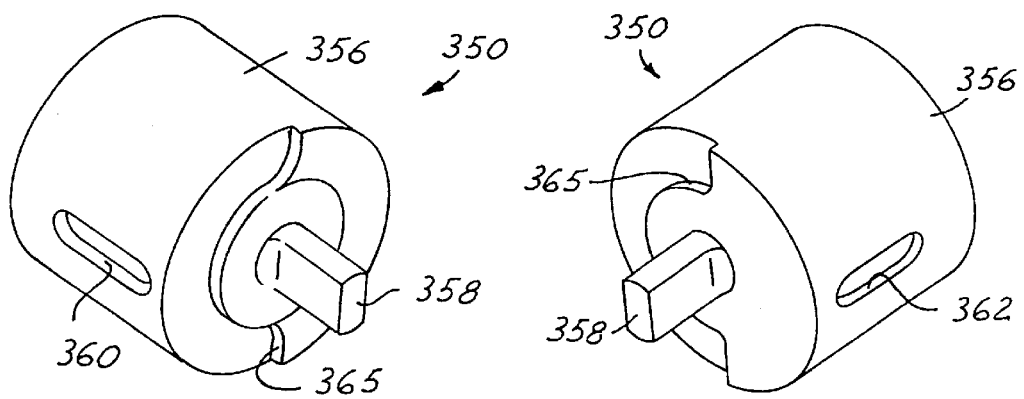
FIGS. 6–7 are perspective views of an alternative embodiment of a lubrication pump for use in an inter-axle differential assembly in accordance with the first embodiment of the present invention.
Figure 8:
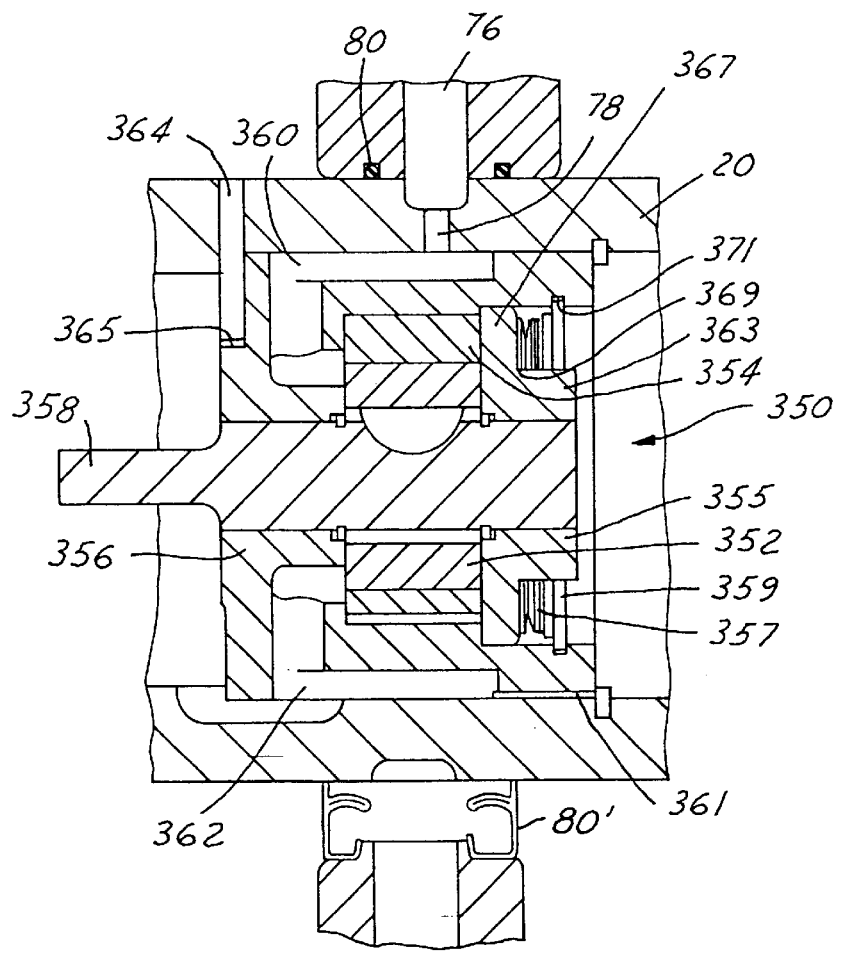
FIG. 8 is a longitudinal cross-sectional view of a portion of the inter-axle differential in accordance with the first embodiment of the present invention incorporating the lubrication pump of FIGS. 6–7.

Referring now to FIGS. 6–8, another embodiment of a lubrication pump 350 in accordance with one aspect of the present invention will be described. Pump 350 is provided to lubricate components of the inter-axle differential assembly 10 during the differential action between the input shaft 14 and the output shaft 30. Pump 30 may comprise a gerotor pump and may include a rotor 352, an impeller 354, a cover plate 355, means, such as spring 357, for biasing plate 355 in the direction of rotor 352 and impeller 354, a snap ring 359, a leaf spring 361 and a body 356 or housing.

Rotor 352 and impeller 354 are provided to create fluid pressure within pump 350 in order to transmit lubricant to bearing surfaces of inter-axle differential 10. Rotor 352 and impeller 354 are conventional in the art. Rotor 352 includes a plurality of radially outwardly extending teeth (not shown) while impeller 354 includes a plurality of radially inwardly extending teeth (not shown) which mesh with the teeth of rotor 352. As is conventional for a gerotor pump, rotor 352 has one less tooth than impeller 354 and rotor 352 may be eccentrically arranged relative to impeller 354. Rotor 352 is drivingly connected to input shaft 14 through a rotor shaft 358. Relative rotation of rotor 352 relative to impeller 354 —responsive to relative rotation of input shaft 14 and output shaft 30 —creates a series of variable volume chambers within pump 350, resulting in the build up of fluid pressure and pumping of lubricant. The volumetric flow of lubricant produced by pump 350 varies in direct proportion to the differential rotational speed of the input and output shafts 14, 30.

Cover plate 355 is provided to support and position other components of pump 350 and to selectively allow passage of lubricant within pump 350. Plate 355 is disposed about rotor shaft 358 at one axial end thereof. Plate 355 is annular in shape having a portion 363 with a first diameter and a portion 367 with a second, increased diameter nearer to rotor 352 and impeller 354. Portions 363, 367 define a shoulder 369 therebetween.

Spring 357 biases plate 355 in the direction of rotor 352 and impeller 354. Spring 357 is conventional in the art and may comprise a wave spring. Spring 357 is disposed between snap ring 359 and shoulder 369 on cover plate 355. As pressure within pump 350 increases, the pressure will overcome the biasing force of spring 357 thereby causing plate 355 to move in a direction away from rotor 352 and impeller 354 and allowing lubrication to pass.

Snap ring 359 is provided to maintain the axial position of other components in pump 350. Snap ring 359 is conventional in the art and extends into a radially outwardly extending groove 371 in pump body 356.

Leaf spring 361 provides torque between impeller 54 and pump body 356 to ensure reversal of pump body 356 upon a change in the direction of differential rotation between input shaft 14 and output shaft 30. Spring 361 is disposed between impeller 354 and pump body 356. When pump 350 is operating, spring 361 is lifted out of contact with impeller 354 due to the hydrodynamic action between impeller 354 and spring 361. When pump 350 stops operating or reverses, hydrodynamic action is lost and spring 361 engages impeller 354 to provide the friction necessary to insure that pump body 356 reverses.

Pump body 356 is provided to house the components of pump 350, define a conduit for the transfer of lubricants and, in accordance with the present invention, to enable reversing of pump 350. Body 356 is generally circular in shape having an outer diameter sized relative to the inner diameter defined by sleeve portion 28 of side gear 20. It should be understood that side gear 20 may be coupled to output shaft 30 or made integral with output shaft 30 as indicated in FIG. 5. Body 356 defines first and second ports 360, 362 which may be located diametrically opposite from one another. As illustrated in FIG. 8, port 360 is in fluid communication with an inlet passage 76 provided in a differential support carrier 75, trough an inlet cross passage 78 in sleeve portion 28 of side gear 20. As explained below, however, pump body 356 may rotate within sleeve portion 28 such that port 362 is in fluid communication with inlet passage 76 through cross passage 78.

In accordance with the present invention, body 356 further defines an arcuate groove 365 in a radially outer surface of body 356. In the illustrated embodiment, groove 365 is located at one longitudinal end of pump body 356. It should be understood, however, that groove 365 may be located elsewhere along the length of body (as shown, for example, in FIG. 3). Groove 365 extends over an angular span of about one-hundred and eighty (180°) degrees. Groove 365 is configured to receive a pin 364 that extends radially inwardly from sleeve portion 28 of side gear 20.

Figure 9:
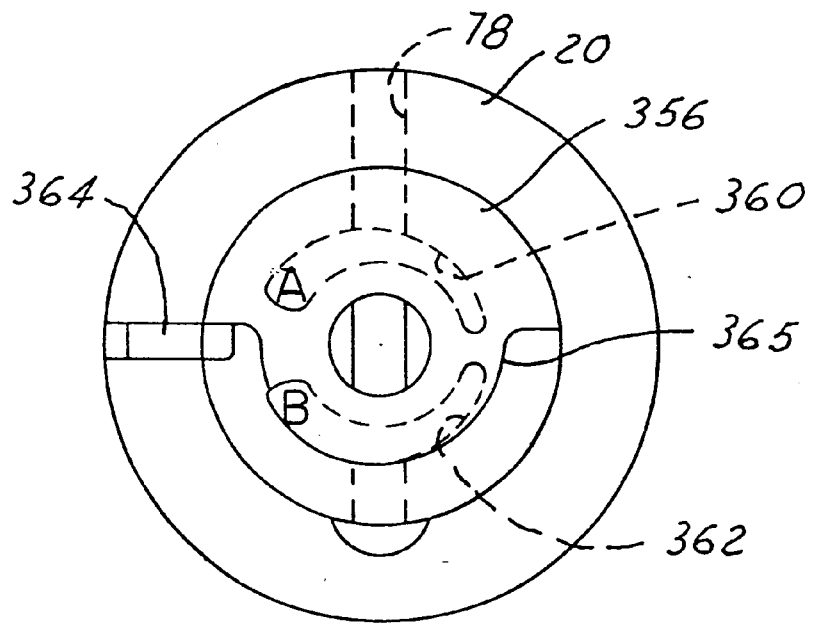
FIGS. 9–10 are front plan views illustrating the lubrication pump of FIGS. 6–7 in two different angular positions.
Figure 10:
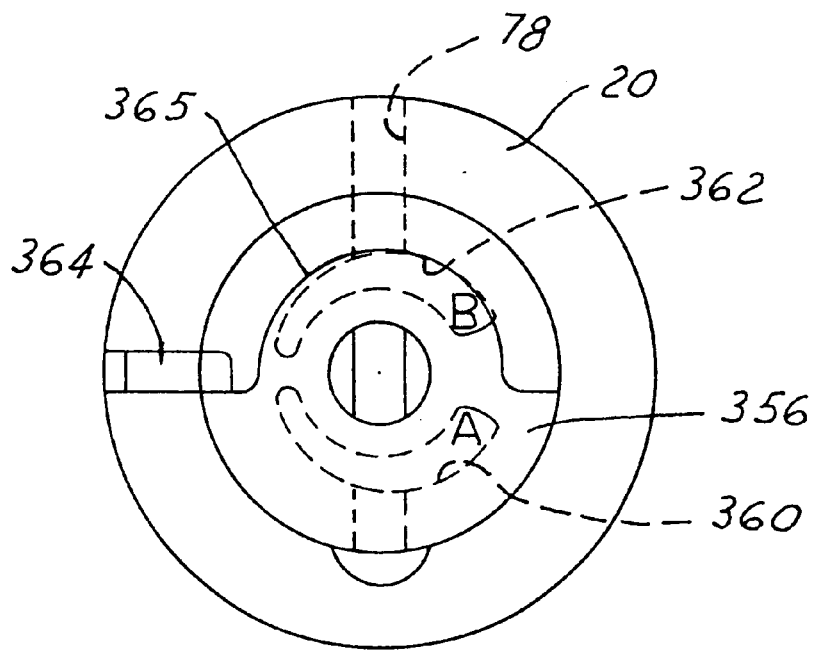

Referring to FIGS. 9 and 10, groove 365 and pin 364 cooperate so as to allow pump body 356 to rotate 180° relative to side gear 20 depending on a relative direction of rotation of output shaft 30 and input shaft 14 and thereby provide a reversing feature for pump 350. As shown in FIG. 9, when there is relative rotation between output shaft 30 and input shaft 14 in a first direction, pump body 356 rotates in a counter-clockwise direction until a first end of groove 365 contacts pin 364. In this position, port 360 assumes an inlet position through which lubricant enters pump body 356 and port 362 assumes an outlet position through which lubrication exist pump body 356. Referring to FIG. 10, when there is relative rotation between output shaft 30 and input shaft 14 in a second direction, pump body 356 rotates in a clockwise direction until a second end of groove 365 contacts pin 364. In this position, port 360 assumes the outlet position and port 362 assumes the inlet position. Thus, the rotation of pump body 356 and ports 360, 362 allows pump 350 to provide a unidirectional flow of lubricant regardless of the direction of the rotation of the rotor 352.

An inter-axle differential 10 incorporating a pump 350 in accordance with the present invention offers several advantages over conventional devices. First, the pump 350 does not require a separate reversing ring or porting plate. As a result, pump 350 can be made more compact which is important given the space constraints in which pump 350 must be located. Second, ports 360, 362 can be asymmetric as illustrated in FIGS. 9 and 10. In conventional devices incorporating a reversing ring or porting plate, the pump's ports must be symmetrical about the longitudinal axis of the pump. In particular, a reversing ring changes the pump's eccentricity, but does not change the position of the ports. A porting plate maintains the eccentricity of the pump, but changes the location of the ports. In either case, the ports must be made symmetrical to handle fluid flow in opposite directions and the end of the ports on the closed mesh side of the gerotor pump must have the same spacing as the end of the ports on the open mesh side of the pump to prevent internal leakage during reversal of the pump. Increasing the spacing on the closed mesh side of the pump to meet the spacing on the open mesh side of the pump, however, results in trapping thereby reducing the efficiency of the pump and limiting operational pressure. In the present invention, the entire pump 350 rotates-including ports 360, 362. As a result, the ports may be asymmetric with the spacing between the ends of the ports on the closed mesh side typically smaller than the spacing between the ends of the ports on the open mesh side of the pump.

Therefore, a novel arrangement of the inter-axle differential assembly in accordance with the present invention including the dedicated lubrication pump provides a compact, efficient and low-cost solution for lubricating components of the inter-axle differential assembly only when needed. The present arrangement of the inter-axle differential assembly substantially reduces parasitic losses associated with powering lubrication pumps.

The foregoing description of the preferred embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

We claim:

1. An inter-axle differential assembly, comprising:
   an input shaft disposed about a longitudinal axis;
   an output shaft disposed about said longitudinal axis;
   a side gear at least partially disposed about said output shaft for rotation therewith;
   a pump disposed about said longitudinal axis between said input and output shafts, said pump including a pump body and said pump body defining a first port and a second port and further defining an arcuate groove in a radially outer surface; and, a pin extending radially inwardly from said side gear and received in said groove wherein said first port assumes an inlet position and said second port assumes an outlet position responsive to rotation of said output shaft in a first direction relative to said input shaft and said first port assumes said outlet position and said second port assumes said inlet position responsive to rotation of said output shaft in a second direction relative to said input shaft.

2. The inter-axle differential assembly of claim 1 wherein said pump comprises a gerotor pump.

3. The inter-axle differential assembly of claim 1 wherein said pump is disposed within a sleeve portion of said side gear.

4. The inter-axle differential assembly of claim 1 wherein said first port is diametrically opposite said second port.

5. The inter-axle differential assembly of claim 1 wherein said arcuate groove spans about one-hundred and eighty degrees.

6. The inter-axle differential assembly of claim 1 wherein said arcuate groove is located at one end of said housing.

7. The inter-axle differential assembly of claim 1 wherein said first and second ports are asymmetric.

8. An inter-axle differential assembly, comprising:

an input shaft disposed about a longitudinal axis;

an output shaft disposed about said longitudinal axis;

a side gear at least partially disposed about said output shaft for rotation therewith;

a gerotor pump disposed about said longitudinal axis between said input and output shafts, said pump including a pump body and said pump body defining a first port and a second port and further defining an arcuate groove in a radially outer surface;

a rotor disposed within said pump body; and, an impeller disposed about said rotor; and, a pin extending radially inwardly from said side gear and received in said groove wherein said first port assumes an inlet position and said second port assumes an outlet position responsive to rotation of said output shaft in a first direction relative to said input shaft and said first port assumes said outlet position and said second port assumes said inlet position responsive to rotation of said output shaft in a second direction relative to said input shaft.

9. The inter-axle differential assembly of claim 8 wherein said pump is disposed within a sleeve portion of said side gear.

10. The inter-axle differential assembly of claim 8 wherein said first port is diametrically opposite said second port.

11. The inter-axle differential assembly of claim 8 wherein said arcuate groove spans about one-hundred and eighty degrees.

12. The inter-axle differential assembly of claim 8 wherein said arcuate groove is located at one end of said housing.

13. The inter-axle differential assembly of claim 8 wherein said first and second ports are asymmetric.

14. The inter-axle differential assembly of claim 8 wherein said gerotor pump further includes a leaf spring mounted between said pump body and said impeller.

15. The inter-axle differential assembly of claim 8 wherein said gerotor pump further includes:

a cover disposed at one axial end of said rotor and said impeller; and, means for biasing said cover in the direction of said rotor and said impeller.

16. An inter-axle differential assembly, comprising:

an input shaft disposed about a longitudinal axis;

an output shaft disposed about said longitudinal axis;

a side gear at least partially disposed about said output shaft for rotation therewith;

a pump disposed about said longitudinal axis between said input and output shafts, said pump including a pump body and said pump body defining a first port and a second port and further defining an arcuate groove in a radially outer surface, said arcuate groove located at one end of said housing and spanning about one-hundred and eighty degrees; and, a pin extending radially inwardly from said side gear and received in said groove wherein said first port assumes an inlet position and said second port assumes an outlet position responsive to rotation of said output shaft in a first direction relative to said input shaft and said first port assumes said outlet position and said second port assumes said inlet position responsive to rotation of said output shaft in a second direction relative to said input shaft.

17. The inter-axle differential assembly of claim 16 wherein said pump comprises a gerotor pump.

18. The inter-axle differential assembly of claim 16 wherein said pump is disposed within a sleeve portion of said side gear.

19. The inter-axle differential assembly of claim 16 wherein said first port is diametrically opposite said second port.

20. The inter-axle differential assembly of claim 16 wherein said first and second ports are asymmetric.

* * * * *

UNITED STATES PATENT AND TRADEMARK OFFICE
CERTIFICATE OF CORRECTION

PATENT NO. : 6,702,703 B2  
DATED : March 9, 2004  
INVENTOR(S) : Gervais et al.

It is certified that error appears in the above-identified patent and that said Letters Patent is hereby corrected as shown below:

<u>Column 9,</u>  
Line 24, delete "housing" and insert -- pump body --.

<u>Column 10,</u>  
Line 8, delete "housing" and insert -- pump body --.  
Line 31, delete "housing" and insert -- pump body --.

Signed and Sealed this

Eighteenth Day of May, 2004

JON W. DUDAS  
*Acting Director of the United States Patent and Trademark Office*